United States Patent
Rodriguez et al.

(10) Patent No.: US 7,908,496 B2
(45) Date of Patent: Mar. 15, 2011

(54) SYSTEMS AND METHODS FOR COMMUNICATING VOLTAGE REGULATION INFORMATION BETWEEN A VOLTAGE REGULATOR AND AN INTEGRATED CIRCUIT

(75) Inventors: Jorge Rodriguez, Portland, OR (US); Alon Naveh, Ramat ha-Sharon (IL); Gil Schwarzband, Or-Yehuda (IL); Hung-Piao Ma, Portland, OR (US); Stefan Rusu, Sunnyvale, CA (US); James G. Hermerding, San Jose, CA (US); Ishmael F. Santos, Milpitas, CA (US); Joseph T. Dibene, II, Olympia, WA (US); Edward Stanford, Dupont, WA (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 11/906,008

(22) Filed: Sep. 29, 2007

(65) Prior Publication Data
US 2009/0089607 A1    Apr. 2, 2009

(51) Int. Cl.
*G06F 1/00* (2006.01)
(52) U.S. Cl. .......................... 713/300; 713/340
(58) Field of Classification Search ................ 713/300, 713/340
See application file for complete search history.

(56) References Cited

U.S. PATENT DOCUMENTS

| | | | |
|---|---|---|---|
| 4,992,951 A | 2/1991 | Glowczewski et al. | |
| 5,375,247 A | 12/1994 | Hueser | |
| 6,732,266 B1 * | 5/2004 | Anderson et al. | 713/100 |
| 7,017,063 B2 * | 3/2006 | Morse et al. | 713/340 |
| 7,624,291 B2 * | 11/2009 | Nguyen | 713/320 |
| 7,685,441 B2 * | 3/2010 | Burton et al. | 713/300 |
| 2004/0128565 A1 * | 7/2004 | Horigan | 713/300 |
| 2006/0041763 A1 * | 2/2006 | Borkar et al. | 713/300 |
| 2008/0054724 A1 * | 3/2008 | Hosomi et al. | 307/69 |
| 2009/0167092 A1 * | 7/2009 | Ma et al. | 307/75 |

FOREIGN PATENT DOCUMENTS
EP     887920     12/1998

OTHER PUBLICATIONS

*International Search Report for International Application* No. PCT/US2008/078056 dated Apr. 27, 2009 (*3 pages*).
*International Written Opinion for International Application* No. PCT/US2008/078056 dated Apr. 27, 2009 (*3 pages*).

* cited by examiner

*Primary Examiner* — Chun Cao
(74) *Attorney, Agent, or Firm* — Blakely, Sokoloff, Taylor & Zafman LLP

(57) ABSTRACT

Systems and method for providing a regulated voltage supply to an integrated circuit. In an embodiment of the invention, a voltage regulator in a system provides an integrated circuit in the system with information related to the voltage regulator providing a supply voltage to the integrated circuit. In another embodiment of the invention, the integrated circuit makes determinations about the operating characteristic of the system using information from the voltage regulator.

24 Claims, 6 Drawing Sheets

SYSTEMS AND METHODS FOR COMMUNICATING VOLTAGE REGULATION INFORMATION BETWEEN A VOLTAGE REGULATOR AND AN INTEGRATED CIRCUIT

BACKGROUND OF THE INVENTION

1. Field of the Invention

The invention relates generally to voltage regulation of an integrated circuit. More particularly, embodiments of the invention relate to communication between an integrated circuit and a voltage regulator providing a supply voltage to the integrated circuit.

2. Background Art

In various computing platforms, an integrated circuit (IC) such as a central processing unit (CPU) will receive power provided by a voltage regulator (VR). The VR may variously provide power to the IC, for example by variously providing different current outputs at a first supply voltage level. The VR may further provide to the IC various other current outputs at a second supply voltage level different from the first supply voltage level.

Typically, the VR determines the providing of power to the IC based on an indication of a particular power need of the IC. For example, a VR may receive a signal from the IC indicating that the IC needs less (or more) power, for example, and/or that the IC needs to enter a mode of operation better suited for a particular level or range of power consumption. In response to the received signal, the VR may allocate more or less voltage regulation resources to the providing of a supply voltage to the IC. For example, the VR may allocate a set of phases of the VR, where each of the allocated phases contributes current to the total current output of the VR.

In allocating voltage regulation resources, the VR may allocate resources which are rated for different optimal levels of power output. Therefore, at any given time, the VR may be operating at greater or lesser level of power efficiency, depending on the particular selection of voltage resources dedicated to provide an output current. Also, at any given time, the VR may be operating at a particular load level—e.g. a particular power load and/or a particular thermal load—which limits the capacity of the VR to accommodate additional power requirements of the IC. Unfortunately, the level of efficiency of the VR at any given time and/or the existing load of the VR may be unrelated to whether increased data processing is being demanded of the IC. As a result, the IC may respond to increased processing demands by requesting the VR to allocate a particular combination of voltage regulation resources which is less efficient or beyond an operating capacity of the VR.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
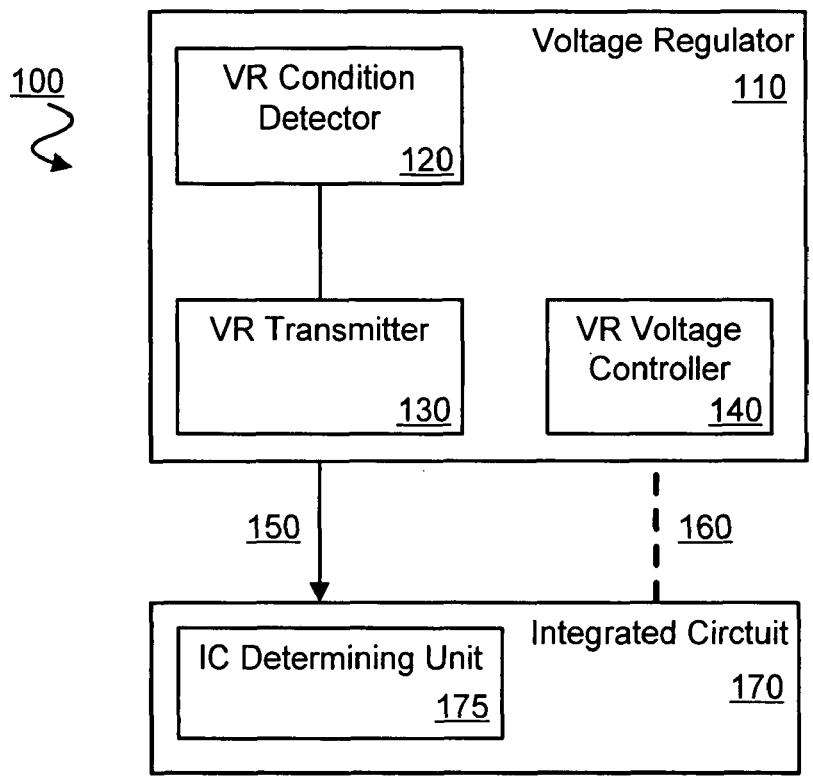
FIG. 1 is a block diagram illustrating a system capable of implementing one embodiment of the invention.

FIG. 1 is a block diagram of system 100 according to an embodiment of the invention. System 100 includes a VR 110 providing power to IC 170. In an embodiment of the invention, VR 110 includes VR voltage controller 140 to variously output to IC 170 a supply voltage 160 of different voltage levels. IC 170 may include any of a variety of circuits integrated on a semiconductor substrate, including, but not limited to a microprocessor, an individual processing core or any other suitable IC. System 100 may be part of a larger platform such as a desktop or laptop computer (e.g. on a computer motherboard), mobile platform, a server platform or in any other suitable computing platform, according to some embodiments. For example, voltage regulator 110 may be implemented as a voltage regulator "module" that is mounted to a substrate that in turn may be coupled to a motherboard, as a voltage regulator "down" having elements that are mounted directly on a motherboard, or in any other fashion. Furthermore, each of VR 110 and IC 170 may implement embodiments of the invention as individual devices.

Generally, voltage regulator 110 may comprise a device to provide power at a particular supply voltage 160 to IC 170. According to some embodiments, VR voltage controller 140 may adjust the supply voltage 160. For example, VR voltage controller may adjust the supply voltage in response to one or more communications (not shown) from IC 170.

In the case course of providing supply voltage 160 to IC 170, the VR 110 may, at a given time, have a particular condition as a result of the VR 110 providing supply voltage 160 to IC 170. For example, providing the supply voltage 160 to IC 170 may result in the VR 110 operating in a particular thermal state such as a temperature of one or more components of the VR 110. Alternatively or in addition, the VR 110 providing the supply voltage 160 to IC 170 may result the VR 110 having a particular type or level of power output, e.g. a particular current output at a particular voltage, as the IC 170 draws power based on its operating load.

In various embodiments of the invention, VR 110 may include a VR condition detector 120 to detect a particular condition of the VR 110 such as one associated with the VR 110 providing supply voltage 160 to IC 170. VR condition detector 120 may include any of a variety of combinations of detection elements including, but not limited to, voltage detectors, current detectors, thermal detectors, timers, and signal detectors. VR condition detector 120 may, for example, variously detect one or more of an existing state of VR 110, a change of state in VR 120 and a rate of change of a state in VR 120. VR 110 may further include a VR transmitter 130 coupled to the VR condition detector 120 to send from VR 110 to IC 170 information 150 about the detected condition of the VR 110. In various embodiments of the invention, IC 170 may include a determining unit 175 to determine an operating characteristic of system 100 based on the sent information 150. As will be discussed hereafter, operating characteristics of system 100 may include characteristics of IC 170 and/or VR 110.

Figure 2:
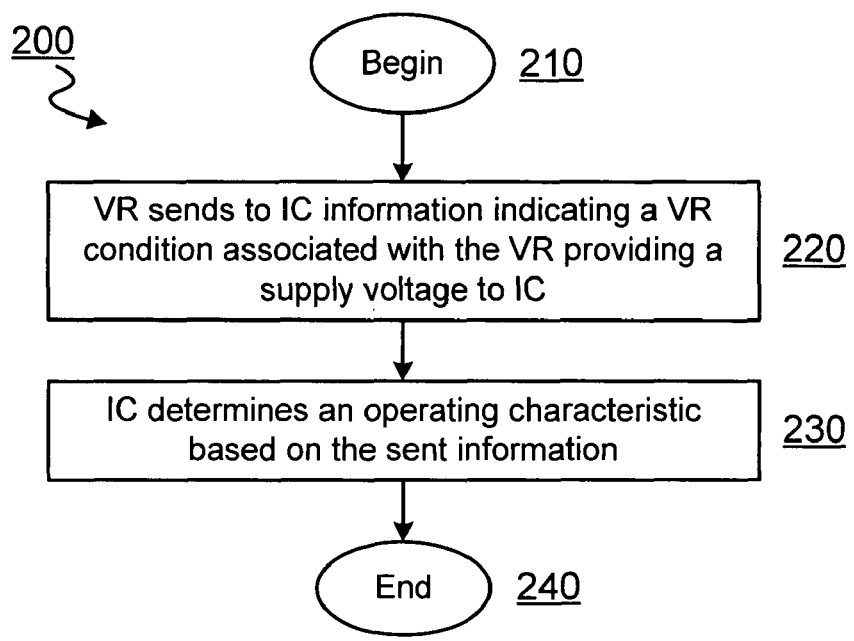
FIG. 2 is a flow diagram illustrating a method according to an embodiment of the invention.

FIG. 2 illustrates an algorithm 200 for implementing a method according to an embodiment of the invention. In various embodiments of the invention, the algorithm may be implemented by a system having a VR providing a supply voltage to an IC. For example, the algorithm 200 may be implemented by a system such as system 100. The algorithm 200 begins at 210 with the VR configured to provide a supply voltage to an IC. At 220, the VR sends to the IC information indicating a condition of the VR which is associated with VR providing the supply voltage to the IC.

As used herein, information indicating a condition of the VR which is associated with VR providing the supply voltage to the IC may include information indicating the providing of the supply voltage by the VR, information indicating conditions of the VR resulting from the providing of the supply voltage by the VR, and/or information indicating conditions of the VR which are necessary for the providing of the supply voltage by the VR. Upon receiving the information sent from the VR, the IC may, at 230, determine an operating characteristic of the system to which the VR and the IC belong. As used herein, operating characteristic of the system may include an existing condition of the system—e.g. a state of one or more elements of the system, a change of such a state, and/or a rate of change of such a state. Furthermore, operating characteristics may include anticipated future conditions of the system and/or any optimal or otherwise desirable operating conditions of the system. In one embodiment of the invention, operating characteristics of the system includes operating characteristics of VR 110 and/or IC 170.

Figure 3:
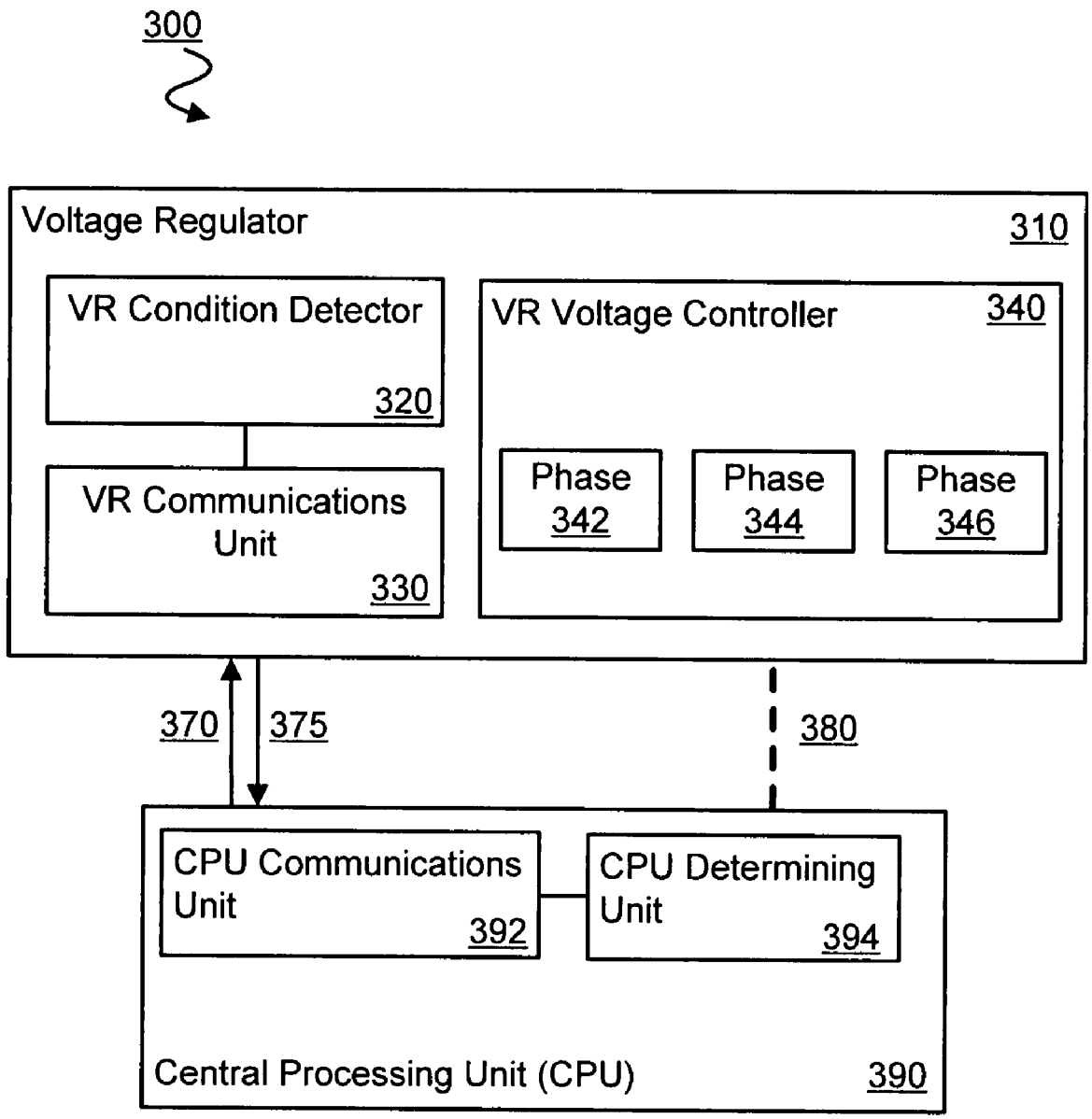
FIG. 3 is a block diagram illustrating a system capable of implementing one embodiment of the invention.

FIG. 3 is a block diagram illustrating particular details of a system 300 capable of implementing an embodiment of the invention. In system 300, the IC to which VR 310 provides a supply voltage 380 is a central processing unit (CPU) 390. Additionally or alternatively, VR 310 may provide a supply voltage to any of a variety of other integrated circuits having data processing capabilities. For example, VR 310 may provide a supply voltage to some or all of a group of data processing circuits integrated on a common semiconductor substrate, such as a single processor core in a group of processor cores. Additionally or alternatively, the VR 310 may provide a supply voltage to a data processing circuit which is integrated into the same semiconductor substrate as is the VR 310 itself.

As CPU 390 operates over time, it may adjust its operation according to varying power requirements by varying the power load requested from VR 310. In an embodiment of the invention, VR 310 may include hardware and/or software means for variably delivering power to CPU 390 under varying loads. For example, in certain embodiments of the invention, VR voltage controller 340 may include one or more phases 342, 344 and 346, such as those of a multi-phase buck regulator. Each of phases 342, 344 and 346 contributes to an overall output current of the VR 310 to the CPU 390, in aid of delivering power to the CPU 390 at the supply voltage 380. At any given time, a particular selection of phases 342, 344 and 346 may be contributing current at supply voltage 380 in order to meet the power requirements of CPU 390. However, a change in the power requirements of CPU 390 may require a new current output from VR 310 and/or a new voltage level for supply voltage 380. As a result, a different selection of phases 342, 344 and 346 may be more efficient than the current selection in meeting the new power requirements of CPU 390. Similarly, other VR elements may exhibit efficiencies suited for particular types and/or ranges of power delivery.

As discussed in reference to FIG. 1, in the case course of providing supply voltage 380 to CPU 390, the VR 310 may, at a given time, have a particular condition as a result of the VR 310 providing supply voltage 308 to CPU 390. In various embodiments of the invention, VR 310 may include a VR condition detector 320 to detect a particular condition of the VR 310 such as one associated with the VR 310 providing supply voltage 380 to CPU 390. VR condition detector 320 may include any of a variety of combinations of detection elements including, but not limited to, voltage detectors, current detectors, thermal detectors, timers, signal detectors and processing circuitry. VR 310 may further include a VR transmitter 330 coupled to the VR condition detector 320 to send from VR 110 to IC 170 information 375 about the detected condition of the VR 310. In various embodiments of the invention, CPU 390 may include a CPU determining unit 394 to determine an operating characteristic of system 300 based on the sent information 150.

Figure 4:
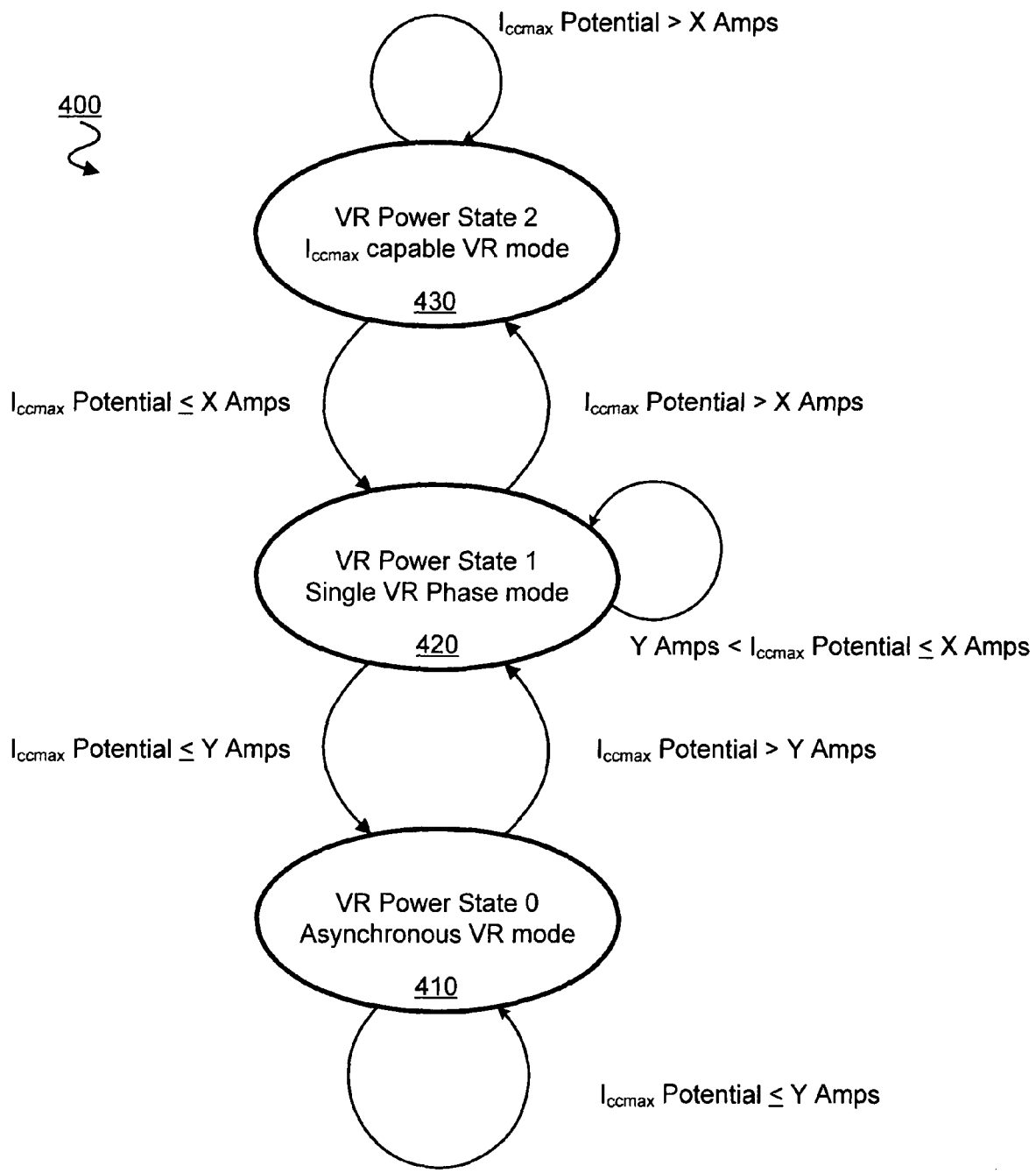
FIG. 4 is a state diagram illustrating an operation of a voltage regulator implementing one embodiment of the invention.
Figure 5:
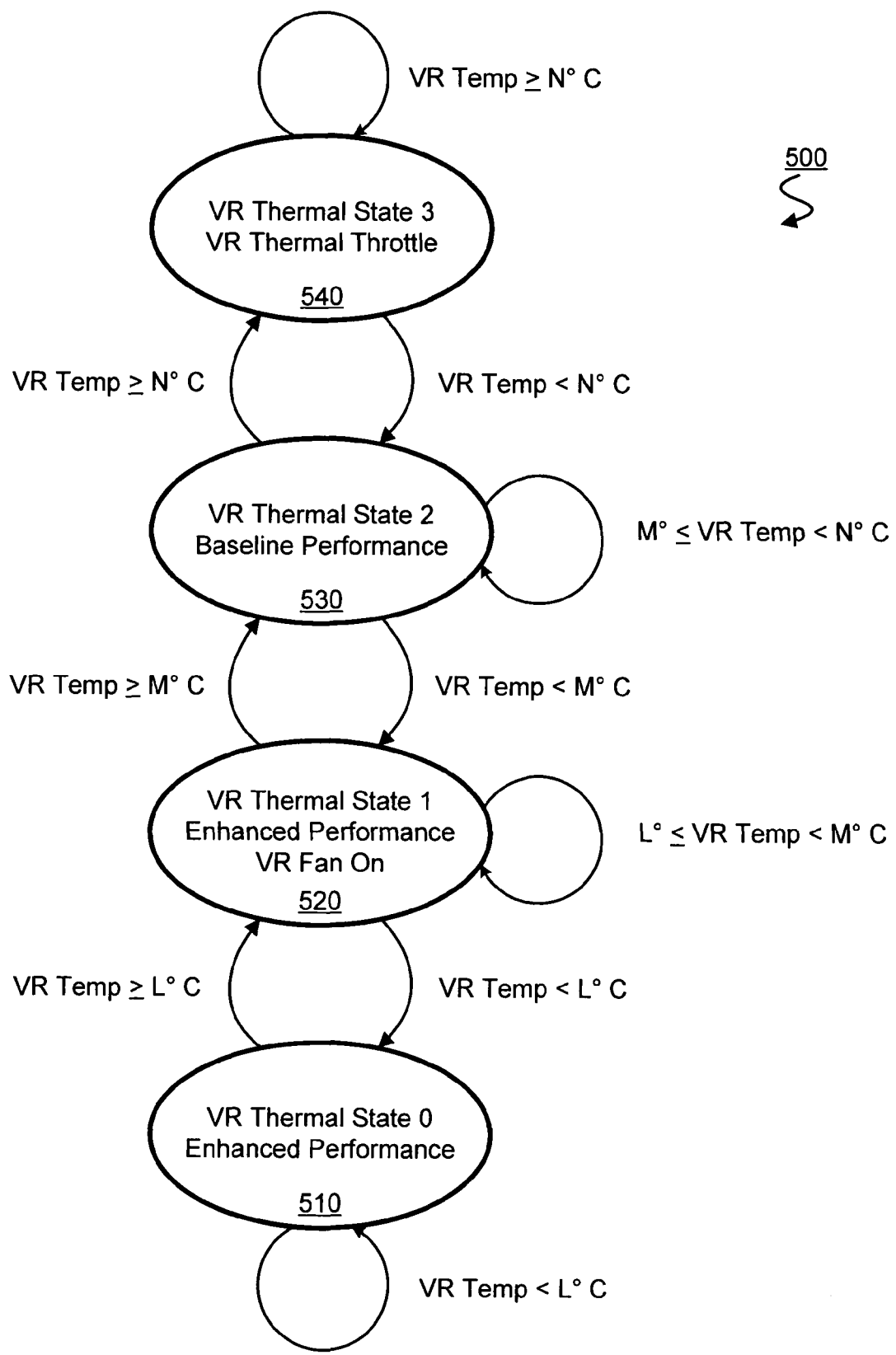
FIG. 5 is a state diagram illustrating an operation of a voltage regulator implementing one embodiment of the invention.
Figure 6:
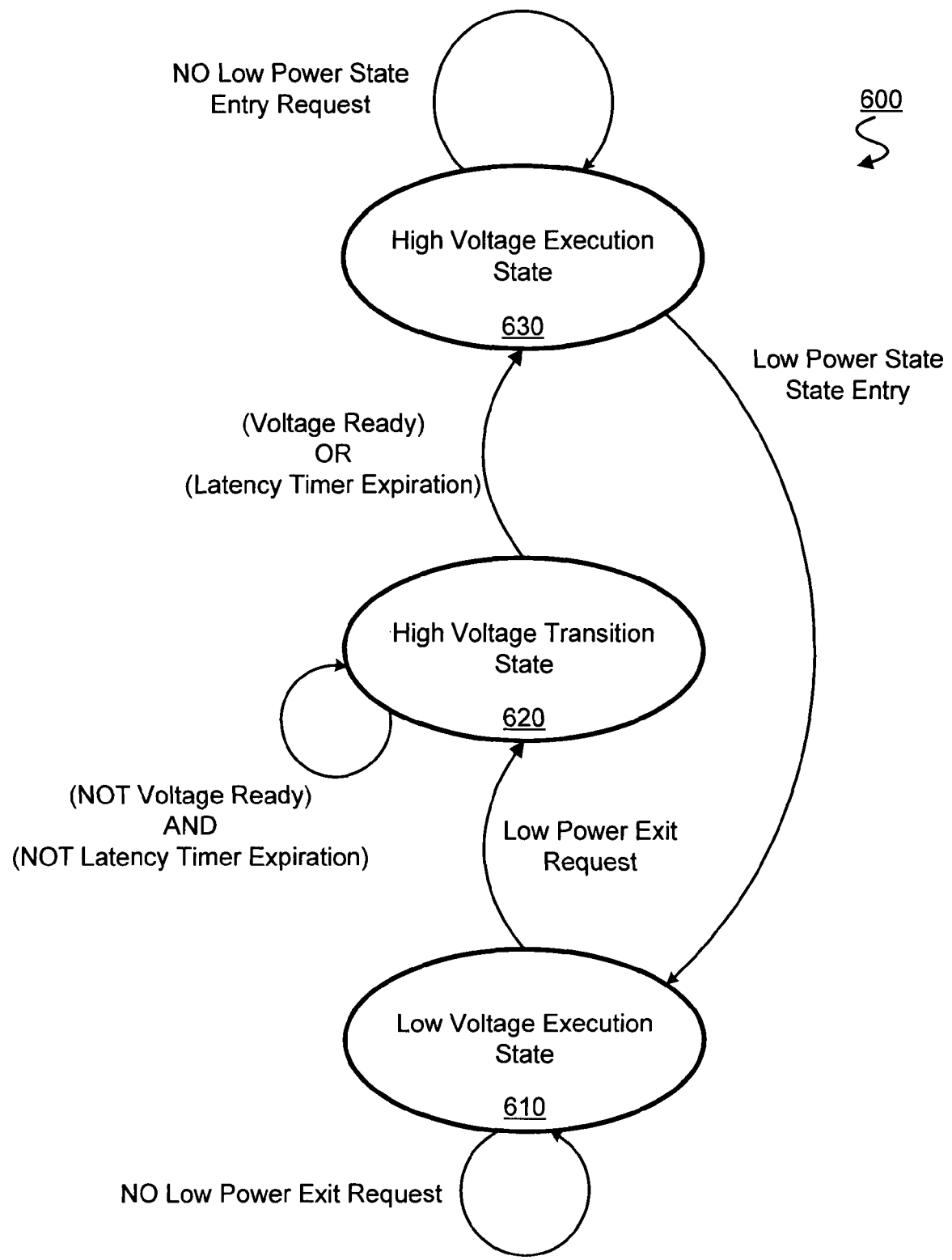
FIG. 6 is a state diagram illustrating an operation of a voltage regulator implementing one embodiment of the invention.

In an embodiment of the invention, CPU 390 may further provide communication 370 to VR 310 to variously determine, direct, and/or indicate a desired state of operation of system 300 based on the determined operating characteristic of system 300. FIGS. 4-6 depict various states of operation for devices such as VR 110 and IC 170 according to embodiments of the invention.

FIG. 4 includes a state diagram 400 illustrating transitions of a VR variously operating in different power states in the course of providing power to an IC according to an embodiment of the invention. State diagram 400 may be implemented by a VR such as VR 310, for example. More particularly, state diagram 400 may be implemented by a VR capable of employing various combinations of one or more phases, e.g. phases 342, 344 and 346, in providing a regulated voltage supply to an integrated circuit. Although power states of a VR are described hereafter with respect to different combinations of phases of the VR, it is understood that the invention may be extended to include additional or alternative classifications of a VR operating in different power states.

As used herein, a VR operating in a given power state refers to a particular combination of VR elements operating in a particular combination of modes in the course of providing a supply voltage. Insofar as it refers to a particular state of operation of the VR, the VR operating in a given power state is to be distinguished, for example, from an output power resulting from such operation. By way of illustration, a VR operating in a given power state may, in various embodiments of the invention, provide any of a variety of combinations of output power, voltage and/or current levels which are each consistent with the VR operating in the given power state. Moreover, a particular combination of output power, voltage and/or current levels may be consistent with the VR operating in either a first power state or a second power state, although the VR operating efficiency may vary between the two power states.

In state diagram 400, the VR may operate in a VR Power State 0 410 associated with some minimal output capacity of the VR. In one embodiment, VR Power State 0 410 may represent operation of the VR which allows for asynchronous current output from the VR, wherein the output current level may be allowed to drop to zero at least occasionally. VR Power State 0 410 may be achieved, for example, by having a single VR phase operating in a discontinuous current mode.

Additionally or alternatively, the VR may operate in a VR Power State 1 420 associated with some intermediate output capacity of the VR. In one embodiment, VR Power State 1 420 may represent operation of VR which allows for continuous current output from the VR, wherein the output current level may not to drop to zero. VR Power State 1 420 may be achieved, for example, by having a single VR phase operating in a continuous current mode to provide at least some minimal current output.

Additionally or alternatively, the VR may operate in a VR Power State 2 430 associated with some maximum output capacity of the VR. In one embodiment, VR Power State 2 430 may represent operation of VR which allows for continuous current output from the VR, wherein the VR operates more efficiently at certain higher current output levels. VR Power State 2 430 may be achieved, for example, by having all phases of the VR contribute to current output.

In an embodiment of the invention, an IC such as CPU 390 may direct a VR to transition between operating in a first power state and operating in a second power state. In the exemplary case of FIG. 4, an IC may direct a VR to change power state based at least in part on the IC detecting of a potential worst case current load ($I_{ccmax}$) of the IC. For example, the CPU determining unit 394 may be able to detect $I_{ccmax}$ based on current data processing operations and/or data processing requests which are currently queued or otherwise pending.

In the case of state diagram 400, an IC may not direct the VR to transition out of operation in VR Power State 0 410 as long as $I_{ccmax}$ is at or below some first threshold current level Y Amperes (Amps). In one embodiment, this first threshold current level Y Amps may be in the range 2-4 Amps. The IC may direct the VR to transition from operating in VR Power State 0 410 to operating in VR Power State 1 420 once the IC detects that $I_{ccmax}$ is greater than Y Amps. Similarly, the IC may direct the VR to transition from operating in VR Power State 1 420 to operating in VR Power State 0 410 once the IC detects that $I_{ccmax}$ is less than or equal to Y Amps. Furthermore, in the exemplary case of state diagram 400, the IC may not direct the VR to transition away from operating in VR Power State 1 420 while IC detects $I_{ccmax}$ to be greater than the first threshold current level Y Amps and less than or equal to some second threshold current level X Amps. In one embodiment of the invention, this second threshold current level X Amps may be in the range 22-24 Amps. The IC may direct the VR to transition from operating in VR Power State 1 420 to operating in VR Power State 2 430 once the IC detects that $I_{ccmax}$ is greater than X Amps. Similarly, the IC may direct the VR to transition from operating in VR Power State 2 430 to operating in VR Power State 1 420 once the IC detects that $I_{ccmax}$ is again less than or equal to X Amps. The IC may not direct the VR to transition away from operating in VR Power State 2 430 while IC detects $I_{ccmax}$ to be greater than the second threshold current level X Amps.

In an embodiment of the invention, the VR transitioning between power states according to state diagram 400 may communicate information such as information 375 to indicate the existing power state VR to an IC such as CPU 390. In another embodiment, the VR may communicate a condition of the VR to a CPU such as CPU 390, whereupon the CPU 390 will determine that the VR is in a particular power state. The CPU may further determine whether and/or how a particular operating characteristic of the system 300 may be changed to avail of the indicated power state of the VR.

FIG. 5 includes a state diagram 500 illustrating transitions of a VR variously operating in different thermal states in the course of implementing an embodiment of the invention. State diagram 500 may represent thermal state transitions of a VR such as VR 310, for example. As used herein, a thermal state of the VR may refer to a particular thermal value or range of thermal values (e.g. a temperature range) in which one or more components of the VR operate. Determination of the thermal state of a VR may be performed by the VR itself or, for example, by an IC such as CPU 390. For example, a VR may determine that one or more of its components are operating in a particular temperature range associated with a given thermal state, and communicate that thermal state to the IC. Additionally or alternatively, the VR may simply communicate to the IC a temperature at which one or more of its components are operating, where the IC determines the thermal state of the VR based on the communicated temperature.

State diagram 500 includes VR Thermal State 0 510, VR Thermal State 1 520, VR Thermal State 2 530 and VR Thermal State 3 540. One or more VR thermal states may have respective sets of VR operating conditions associated with them. For example, a particular VR thermal state may be associated with a particular level of performance which may be requested from the VR in that thermal state. In the exemplary case of FIG. 5, the VR may demonstrate an independent ability to satisfy a particular high level of power output (enhanced level) when the VR is in VR Thermal State 0 510. By contrast, the VR may demonstrate an dependent or qualified ability to satisfy the enhanced level of power output when the VR is in VR Thermal State 1 520. For example, while the VR is in VR Thermal State 1 520, a VR cooling fan may need to be activated to prevent the VR temperature from increasing above M° C. Furthermore, the VR power output may be limited to a baseline level of performance less than the enhanced level of performance when the VR is in VR Thermal State 2 530. Finally, the VR may require throttling of power requirements by the IC when the VR is in VR Thermal State 3 540.

The VR may be determined to be in VR Thermal State 0 510 where the VR temperature is below a first threshold temperature L° C. The VR may be determined to be in VR Thermal State 1 520 where the VR temperature is at or below the first threshold temperature L° C. and a less than a higher second threshold temperature M° C. The VR may be determined to be in VR Thermal State 2 530 where the VR temperature is at or below the second threshold temperature M° C. and a less than a higher third threshold temperature N° C. Finally, the VR may be determined to be in VR Thermal State 3 540 where the VR temperature is at or above the third threshold temperature N° C. In an embodiment of the invention, L° C., M° C. and N° C. may be temperatures in the temperature ranges of 78° C. to 82° C., 88° C. to 92° C. and 103° C. to 107° C., respectively.

The determining of VR temperature may be performed by a detector such as VR condition detector 320. In various embodiments of the invention, the determining of a VR thermal state may be performed by a detector such as VR condition detector 320 or by an element of an IC such as CPU determining unit 394. Determining of a VR thermal state by an element of an IC such as CPU determining unit 394 may be based on thermal information provided by a VR, such as information 375.

In the case of state diagram 500, a particular VR thermal state may be associated with the VR having a particular capacity to supply voltage to an IC. The VR may detect one or more thermal values of the VR associated with the providing of the IC supply voltage. The VR may then send to the IC information about the detected thermal values, such as a determined VR thermal state or one or more thermal values to be used in determining a VR thermal state. Based on the information sent by the VR, the IC may determine an operating characteristic of the system in which the IC and the VR operate. For example, the IC may determine (e.g. at CPU determining unit 394) one or more of an operating load of the VR, a capacity of the VR to increase power output, a more efficient operating mode for the VR, and a more efficient operating mode of the IC.

FIG. 6 includes a state diagram 600 illustrating different voltage states of an IC implementing an embodiment of the invention. State diagram 600 may be implemented by an IC such as CPU 390, for example. For example, state diagram 600 may be implemented by a CPU capable of variously processing data while operating in one of a variety of different voltage states. Each voltage state may, for example, be associated with any of a variety of combinations of operating characteristics of the CPU. For example, an existing or desired clock frequency at the CPU may determine a need for the CPU to operate at a particular voltage state. Additionally or alternatively, whether a cache of the CPU is or needs to be flushed may determine a need for the CPU to operate at a particular voltage. By flushing the cache, the integrity of the contents of the cache (data) may be better maintained during a low power state in which the voltage supplied to the cache is reduced. Additionally or alternatively, whether and/or how the CPU may use gated clocks to limit power consumption may determine a need for the CPU to operate at a particular voltage. In an embodiment of the invention, a CPU may analyze microinstructions to determine which registers in a processing cycle are not involved in the processing cycle, and prevents those registers from being clocked during such processing cycle. Hence, inactive registers during a processing cycle do not consume power at the level of active registers, thus lowering overall power usage by any system employing such gated-clock registers.

The exemplary case of state diagram 600 illustrates a CPU having a transition state 620 between a low voltage state 610 and a high voltage state 630. The CPU may direct a VR to provide a particular supply voltage to accommodate a desired voltage state of the CPU. For example, when the CPU is operating in low voltage state 610, it may determine that operating conditions such as the current processing demands on the CPU require the CPU to transition to a higher voltage state. Based on this determination, the CPU may send a low power exit request to the VR, e.g. to indicate that the VR must provide to the CPU a supply voltage at a higher voltage level than currently provided. The VR may respond to the low power exit request by initiating an increase in the voltage level of the supply voltage which will eventually allow the CPU to operate in high voltage state 630.

As the CPU is waiting for the VR to increase the supply voltage to a voltage level enabling high voltage execution state 630, the CPU may operate in a high voltage transition state 620. In an embodiment of the invention, the CPU may determine when to transition to high voltage execution state 630 based on one or more operating conditions. For example, CPU may start a latency timer indicating the length of time the CPU has been operating in high voltage transition state 620. The CPU may transition from high voltage transition state 620 to high voltage execution state 630 in response to the latency timer indicating that the CPU has been operating in high voltage transition state 620 for at least some minimum latency time period which the VR needs in transitioning from providing a voltage level for the low voltage execution state 610 to providing a voltage level for the high voltage execution state 630.

In various embodiments, the CPU may also transition from high voltage transition state 620 to high voltage execution state 630 in response to a voltage ready signal from VR indicating that the VR is providing a voltage level for the high voltage execution state 630. Such an indication may, for example, be sent from the VR to the CPU where the CPU does not include an adequate means for determining for itself that a supply voltage provided by the VR is sufficient for operating in a particular voltage state. In such an embodiment, a CPU whose voltage states are represented by state diagram 600 will not transition from high voltage transition state 620 to high voltage execution state 630 until either (1) the expiration of a latency timer tracking some minimum latency time period, or (2) an indication from the VR that the VR is now providing a voltage level for the CPU to operate in high voltage execution state 630. Once in high voltage execution state 630, the CPU may continue to operate at the higher supply voltage until it needs to request entry into a low power state. Such a request may take place where an existing and/or expected processing load of the CPU is sufficiently low that a power requirement of the CPU can be met while the VR is providing a voltage level for the low voltage execution state 610.

In various embodiments of the invention, the CPU may operate in various other voltage states in addition to or as an alternative to one or more of voltage states 610, 620 and 630. Similarly, various operating conditions for the CPU transitioning between voltage states may exist in addition to or as an alternative to those illustrated in state diagram 600. For example, a voltage ready signal similar to that described above with reference to High Voltage Transition State 620 may also be used to control the CPU in transitioning from high voltage execution state 630 to low voltage execution state 610.

Figure 7:
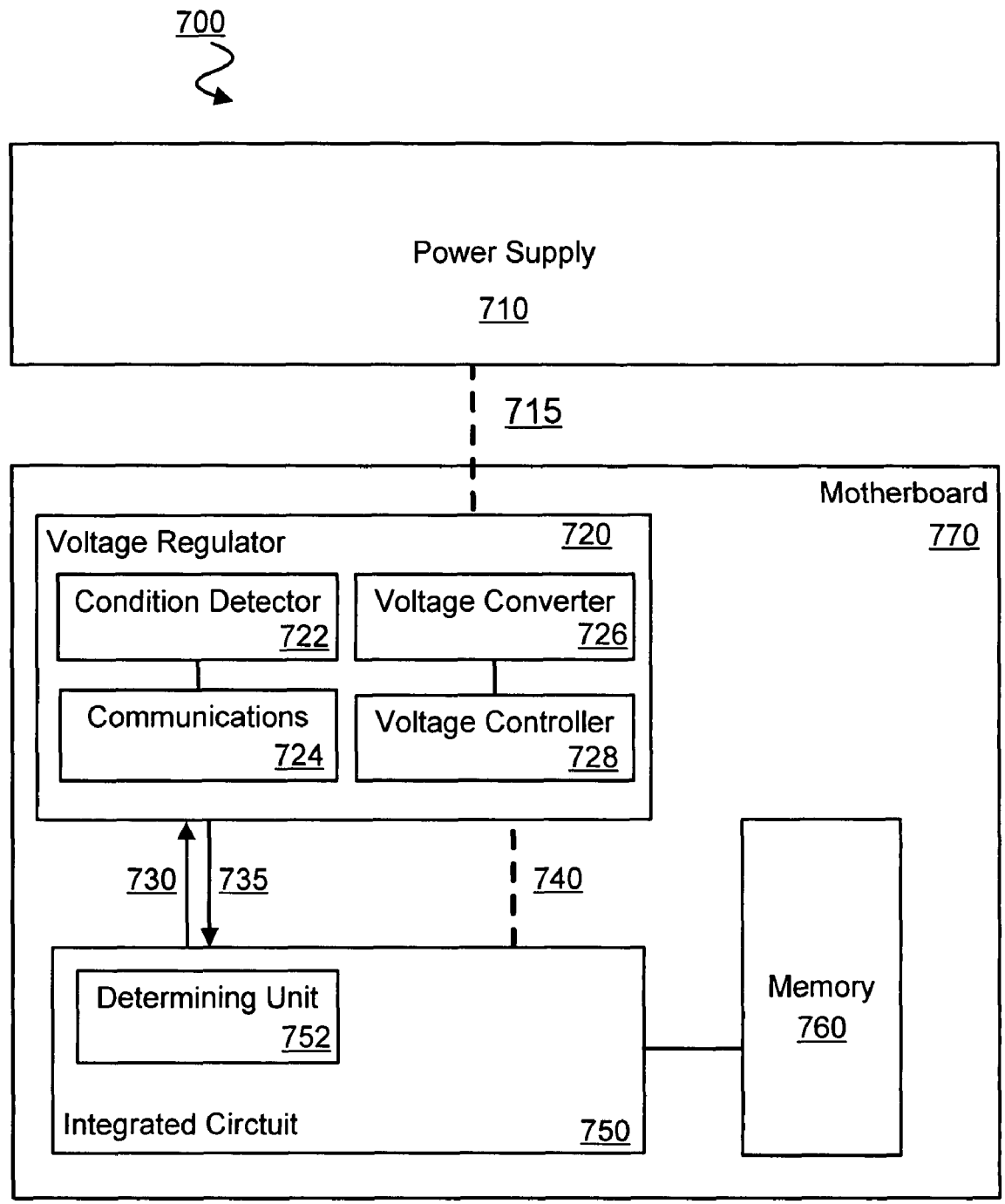
FIG. 7 is a block diagram illustrating a system capable of implementing one embodiment of the invention.

FIG. 7 illustrates a system 700 to implement an embodiment of the invention. System 700 includes VR 720, IC 750, motherboard 770, power supply 710, and memory 760. System 700 may comprise components of a desktop computing platform, a mobile platform or a server platform, for example. Memory 760 may comprise any type of memory for storing data, such as a Single Data Rate Random Access Memory (RAM), a Double Data Rate RAM, a Static RAM, a Dynamic RAM, and/or a Programmable Read Only Memory (ROM). VR 720 may receive power 715 from power supply 710 and regulate the power based on power requirements of IC 750. Motherboard 770 may include signal and/or power lines connecting one or more of power supply 710, VR 720, IC 750 and memory 760. System 700 may include a condition detector 722, communications unit 724, voltage controller 728 and determining unit 752 similar to corresponding elements discussed with reference to FIG. 3. System 700 may further include voltage converter (e.g. AD/DC converter or DC/DC converter) to convert power 715 from power supply 710 for use by voltage controller 728.

Techniques and architectures for regulating voltage are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method in a system including a voltage regulator (VR) and an integrated circuit (IC), the method comprising:
    operating the VR in a first power state for providing from the VR to the IC a level of power output at a supply voltage level;
    detecting at the VR a condition of the VR related to the providing to the IC the level of power output at the supply voltage level;
    sending information from the VR to the IC about the detected condition of the VR;
    determining at the IC an operating characteristic of the system based on the sent information; and
    in response to the determining, the IC directing the VR to transition from operating in the first power state to operating in a second power state for providing from the VR to the IC the level of power output at the supply voltage level.

2. The method of claim 1, wherein the information about the detected condition includes information indicating at least one of a voltage output of the VR, a power output of the VR, a current output of the VR and a temperature of the VR.

3. The method of claim 1, wherein the operating characteristic includes an ability of the IC to transition to a higher frequency mode of operation.

4. The method of claim 1, wherein the operating characteristic includes a load on the VR.

5. The method of claim 1, wherein determining an operating characteristic includes determining that the VR is operating in a state from a predetermined set of operating states, and wherein directing the VR to transition from operating in the first power state to operating in the second power state includes sending from the IC to the VR a signal directing the VR to operate in another state from the predetermined set of operating states.

6. The method of claim 5, wherein sending of the signal directing the VR to operate in another state from the predetermined set of operating states is based on a detecting of a potential worst case current load of the IC.

7. A method performed at a voltage regulator (VR), the method comprising:
    operating in a first power state for providing from the VR to an integrated circuit (IC) a level of power output at a supply voltage level;
    detecting a condition resulting from providing to the IC the level of power output at the supply voltage level;
    sending information to the IC about the detected condition;
    receiving a signal from the IC, the signal generated based on the sent information about the detected condition; and
    in response to the received signal, transitioning the VR from operating in the first power state to operating in a second power state for providing from the VR to the IC the level of power output at the supply voltage level.

8. The method of claim 7, wherein the information about the detected condition includes information indicating at least one of a voltage output of the VR, a power output of the VR, a current output of the VR and a temperature of the VR.

9. The method of claim 7, wherein operating the VR in the first power state is in response to a request of the IC, and wherein the sent information includes a confirmation that the VR has satisfied the request.

10. A voltage regulator (VR) comprising:
    a voltage controller to operate in a first power state for providing from the VR to an integrated circuit (IC) a level of power output at a supply voltage level;
    a detecting unit to detect a condition of the VR related to providing to the IC the level of power output at the supply voltage level; and
    a communications unit to send information to the IC about the detected condition of the VR, the communications unit further to receive a signal from the IC, the signal generated based on the sent information about the detected condition;

wherein, in response to the received signal, the voltage controller further to transition from operating in the first power state to operating in a second power state for providing from the VR to the IC the level of power output at the supply voltage level.

11. The voltage regulator of claim 10, wherein the information about the detected condition includes information indicating at least one of a voltage output of the VR, a power output of the VR, a current output of the VR and a temperature of the VR.

12. The voltage regulator of claim 10, the communications unit further to receive a request from the IC, wherein the operating in the first power state is in response to the request of the IC, and wherein the information includes a confirmation that the VR has satisfied the request.

13. An integrated circuit (IC) comprising:
a communications unit to receive from a voltage regulator (VR) information about a condition of the VR resulting from an operating of the VR in a first power state for providing from the VR to the IC a level of bower output at a supply voltage level; and
a determining unit to determine an operating characteristic based on the sent information;
wherein, in response to the determining the operating characteristic, the communications unit further to send a signal directing the VR to transition from operating in the first power state to operating in a second power state for providing from the VR to the IC the level of power output at the supply voltage level.

14. The integrated circuit of claim 13, wherein the information about the condition of the VR includes information indicating at least one of a voltage output of the VR, a power output of the VR, a current output of the VR and a temperature of the VR.

15. The integrated circuit of claim 13, wherein the operating characteristic includes an ability of the IC to transition to a higher frequency mode of operation.

16. The integrated circuit of claim 13, wherein the operating characteristic includes a load on the VR.

17. The integrated circuit of claim 13, wherein determining an operating characteristic includes determining that the VR is operating in a state from a predetermined set of operating states, and wherein directing the VR to transition from operating in the first power state to operating in the second power state includes directing the VR to operate in another state from the predetermined set of operating states.

18. The integrated circuit of claim 17, wherein determining the operating characteristic includes determining a potential worst case current load of the IC.

19. A system comprising:
a voltage regulator (VR) including
a voltage controller to operate in a first power state for providing from the VR to an integrated circuit (IC) a level of power output at a supply voltage level,
a detecting unit to detect a condition of the VR resulting from providing to the IC the level of power output at the supply voltage level, and
a VR communications unit to send information to the IC about the detected condition of the VR;
the IC, coupled to the VR, the IC including
an IC communications unit to receive from the VR the sent information about the detected condition of the VR, and
a determining unit to determine an operating characteristic of the system based on the sent information about the condition of the VR,
wherein, in response to the determining the operating characteristic, the communications unit further to send a signal directing the VR to transition from operating in the first power state to operating in a second power state for providing from the VR to the IC the level of power output at the supply voltage level; and
a dynamic random access memory (DRAM) coupled to the IC, the DRAM to store data accessible by the IC.

20. The system of claim 19, wherein the information about the condition includes information indicating at least one of a voltage output of the VR, a power output of the VR, a current output of the VR and a temperature of the VR.

21. The system of claim 19, wherein the operating characteristic includes an ability of the IC to transition to a higher frequency mode of operation.

22. The system of claim 19, wherein the operating characteristic includes a load on the VR.

23. The system of claim 19, wherein determining an operating characteristic includes determining that the VR is operating in a state from a predetermined set of operating states, and wherein directing the VR to transition from operating in the first power state to operating in the second power state includes directing the VR to operate in another state from the predetermined set of operating states.

24. The system of claim 23, wherein sending the signal from the IC to the VR is in response to a detecting of a potential worst case current load of the IC.

* * * * *

UNITED STATES PATENT AND TRADEMARK OFFICE
CERTIFICATE OF CORRECTION

PATENT NO.         : 7,908,496 B2                                           Page 1 of 1
APPLICATION NO.    : 11/906008
DATED              : March 15, 2011
INVENTOR(S)        : Rodriguez et al.

It is certified that error appears in the above-identified patent and that said Letters Patent is hereby corrected as shown below:

In column 11, at line 23 delete, "bower" and insert --power--.

Signed and Sealed this
Twenty-eighth Day of June, 2011

David J. Kappos
*Director of the United States Patent and Trademark Office*